Patented Sept. 7, 1948

2,448,756

UNITED STATES PATENT OFFICE 2,448,756

METHYL SILOXANE ELASTOMERS

Maynard C. Agens, Schenectady, N. Y., assignor to General Electric Company, a corporation of New York No Drawing. Application March 14, 1944, Serial No. 526,473

18 Claims. (Cl. 260—37)

1

The present invention relates to novel synthetic rubbers or elastomers comprising polymeric dimethyl silicone, and to their preparation.

The invention is based on my discovery that gums or solid, elastic products may be prepared by suitable treatment of liquid dimethyl silicones; also that such gums may be compounded with fillers, etc., and molded or extruded to form products exhibiting all of the physical characteristics, such as elasticity, compressibility, etc., of known natural and synthetic rubbers. The elastic products of my invention possess acceptable tensile strengths and can be elongated or stretched in the same manner as known elastomers. The products are characterized by their flexibility at low temperatures (—60° C.) and particularly by their heat-resistance. They have been found to retain their desirable rubber-like properties when heated for long periods of time at elevated temperatures of from 150 to 200° C. without deterioration.

The dimethyl silicones found suitable for the preparation of materials possessing the above-mentioned properties are those obtained by hydrolysis of a pure or substantially pure dimethyl dihalogenosilane, such as dimethyldichlorosilane or an equivalent methyl-substituted silane, such as dimethyl diethoxysilane, containing two methyl groups and two hydrolyzable atoms or groups connected to the silicon atoms. While the term "dimethyl silicone" has been broadly used to designate complex condensation products containing an average of two methyl groups per silicon atom, it is used herein and in the appended claims as referring to a silicone in which all or substantially all of the silicon atoms are each connected to two methyl groups.

The nature of the dimethyl silicones used in carrying out the present invention may best be described by reference to their preparation. In the preparation of methyl halogenosilanes (methyl silicon halides), for example, there is obtained a mixture of methyl halogenosilanes of the formula $(CH_3)_aSiX_{4-a}$ wherein X is a halogen atom and $a$ is a number equal to 1, 2, or 3. By fractional distillation, the individual compounds may be isolated in a substantially pure state, the degree of purity depending on the nature of substituent X as well as on the efficiency of the distillation apparatus. For example, in the fractional distillation of a methyl chlorosilane mixture, dimethyldichlorosilane is obtained at a distillation temperature of about 70° C. at 760 mm. As is the case in most distillation processes, the dimethyldichlorosilane is not absolutely pure but ordinarily contains some methyltrichlorosilane

2 which boils at about 66° C. For the purposes of the present invention, I can use the hydrolysis products of any dimethyldichlorosilane fraction containing not more than 2 mol per cent of methyltrichlorosilane. The best elastomers appear to be obtained from the hydrolysis products of a dimethyldichlorosilane fraction containing not more than 0.5 mol per cent methyltrichlorosilane. In other words, the hydrolysis products found useful in the practice of my invention and hereinafter generically referred to as dimethyl silicones are those consisting of methyl groups and silicon and oxygen atoms and having a methyl to silicon ratio of from 1.98 to 2.00, preferably from 1.995 to 2.00. The particular hydrolysis product employed for making the claimed solid elastic composition may then be considered as being polymeric dimethylsiloxane containing up to 2 mol per cent copolymerized monomethylsiloxane.

The transformation of such liquid, oily, or crystalline silicones to a solid, elastic, curable methyl polysiloxane containing an average of from 1.98 to 2.0 methyl groups per silicon atom, and later to a synthetic elastomer in accordance with my invention is believed due to a rearrangement of the repetitive units ($—(CH_3)_2SiO—$) of the polymers into polymers of extremely high molecular weight which may best be described as gums. This transformation may be accomplished in a number of ways. Catalytic treatments which I have found suitable broadly comprise contacting the dimethyl silicone with ferric chloride hexahydrate, or with ferric oxide and aluminum chloride, or with chlorinated tricresyl phosphate until a gum is formed. This gum is then worked on ordinary mixing rolls used in milling rubber until it attains the desired consistency for molding or extruding. More catalyst and filler may be added during this operation. After being formed into the desired shape, the synthetic rubber may be further cured or vulcanized by heating in an oven until the desired degree of cure is obtained.

The liquid dimethyl silicone which I use as starting material may be obtained by hydrolyzing a pure or substantially pure dimethyl dichlorosilane in water, in hydrochloric acid, or in a solution of ferric chloride. Although the method of hydrolysis is not critical, I prefer to use a procedure which yields a liquid product containing a minimum of low-boiling polymers. Such products are obtained for example, when the hydrolysis is carried out in a solution of ferric chloride.

Having described my invention broadly, the following specific examples are given illustrating how it may be carried into effect.

*Example 1.*—A dimethyl silicone was prepared by slowly adding six hundred parts of dimethyl silicon dichloride fraction to a solution of 540 parts of 37 per cent hydrochloric acid in 460 parts water. About 600 parts of water was then added, and the resultant mixture was allowed to separate into two layers. The oily dimethyl silicone layer was washed with additional water and dried over anhydrous sodium sulphate. After separation of the sodium sulphate by filtration the oily liquid was distilled to remove the low molecular weight substances boiling below 190° C. The remaining high boiling oily material was mixed with 75 per cent of its weight of ferric oxide and 1.25 per cent anhydrous aluminum chloride. When this mixture was heated to 130° C. the viscosity of the mixture fell at first and then rapidly increased until the whole mass was converted to a solid mass. This mass was worked on rubber rolls for about one-half hour at 125° C., sheeted, and the sheet molded between heated platens for ten minutes at 150° C. The molded sheet, about 0.050 inch thick, was further cured by heating in an oven at 200° C., for 15 minutes. This time of heating served to bring out the ultimate strength of the sheet as little or no change in its properties was noted after an additional 17 hours' heating at this temperature. The cured sheet had high elasticity, an elongation of over 100 per cent, and was flexible at —60° C. Its resistance to deterioration at high temperatures is evidenced by the heating at 200° C. for 17 hours.

A high boiling liquid dimethyl silicone fraction was employed as the starting material in Example 1. When low boiling liquid dimethyl silicones, alone or in admixture with the high boiling fractions, are used in the preparation of elastomers, I prefer to treat them with small amounts of an iron chloride such as $FeCl_3 \cdot 6H_2O$ to convert the low boilers or mixtures thereof into high molecular weight gums.

*Example 2.*—About 60 parts of a liquid mixture of low-boiling dimethyl silicone polymers, consisting substantially of pentameric and hexameric dimethyl silicones, was mixed with one per cent of its weight of ferric chloride hexahydrate and the resultant mixture heated at 180° C. until it became very viscous. On cooling in a shallow pan, it solidified immediately to a greenish-yellow elastic gum. This gum was dissolved in toluene and filtered through canvas to separate solid particles of ferric chloride suspended therein. After substantially all of the toluene had been evaporated, 31.5 parts of the resultant product was compounded with 13.5 parts ferric oxide to form a red pasty mass. On adding 0.4 part of $AlCl_3$ and heating to 150° C., the material was converted to an elastic solid which was milled for 15 minutes on heated rolls, the temperature of the rolls being increased from 75° C. to 125° C. during the milling period. The product was molded into sheet form by being pressed for ten minutes between heated platens held at 150° C. The resultant sheet was flexible, elastic, and fairly strong. Further heating in an oven at 150° C. to 200° C. improved the strength of the sheet. The cured material resembled the product of Example 1.

*Example 3.*—A mixture of low-boiling dimethyl silicones, principally composed of the trimer and tetramer was heated with a small amount of hydrated ferric chloride. A viscous yellow liquid was obtained which solidified to a gum on cooling. The gum could be mixed with fillers, such as $TiO_2$, etc., on the mill to form a synthetic elastomer.

The catalytic treatment with ferric chloride may also be carried out in solution in an inert solvent such as toluene for example, in which case it may be desirable to increase the quantity of ferric chloride up to about two per cent. On distilling off the solvent and cooling, a tough, elastic gum is obtained. The treatment may also be carried out in the absence of a solvent and at room temperature but at such temperatures the time required to obtain a gum may be prolonged.

*Example 4.*—A liquid dimethyl silicone polymer boiling above 190° C. was mixed with 67 per cent of its weight of ferric oxide, and 1.67 per cent chlorinated tricresyl phosphate containing chlorine in the aliphatic side chains. The mixture was heated at 180° C. for one-half hour and at 150° C. for one hour, and then was milled on rubber rolls at 125° C. for one-half hour. An additional 1.67 per cent chlorinated tricresyl phosphate was incorporated on the rubber rolls at 80° C. The sheet was molded for ten minutes at 150° C. and further cured to a flexible, rubbery product by heating in an oven at 150° C. for 25 minutes and at 195° C. for two and one-quarter hours.

*Example 5.*—A gum obtained by treating a dimethyl silicone with ferric chloride was worked with carbon black and a small amount of chlorinated tricresyl phosphate at 200° C. The resultant cured elastomer was stronger than the ferric oxide-filled elastomer of Example 1.

*Example 6.*—Forty-four parts of liquid dimethyl silicone was mixed with 26 parts of titanium dioxide, 3 parts of ferric oxide, and 0.4 part of aluminum chloride. The mixture was heated at 100° C. until a rubbery mass was formed. The product was mixed on the rolls at 130° C. with an additional 0.5 part of $AlCl_3$ until the desired consistency for extrusion was reached. This material was then extruded in tubular form at 200° C. The strength of the extruded material was improved by further heating at 200° C. to 275° C.

If desired, some of the polymerization may be carried out during the preparation of the liquid starting material. I have found that the quantity of low molecular weight polymers in the liquid may be decreased from the 40 to 50 per cent usually obtained by hydrolysis of dimethyl dichlorosilane in excess water to less than 20 per cent by using a solution of ferric chloride as hydrolysis medium.

*Example 7.*—Two hundred parts of dimethyl dichlorosilane were added to 500 parts of each of three hydrolysis mediums containing 10, 20 and 40 per cent $FeCl_3 \cdot 6H_2O$. The resultant oily layers were extracted with ether, dried with anhydrous sodium sulphate, and isolated by evaporation of the ether. The relative viscosity of the three products was found to increase with the concentration of ferric chloride used, and that part of the oil distilling below 190° C. was found to decrease from 13.7 per cent to 9.6 per cent as the concentration of ferric chloride increased from ten per cent to 40 per cent. The products could be converted to elastomers by heating as described in Examples 2 and 3.

The novel dimethyl silicone elastomers and synthetic rubbers of my invention are useful in applications where materials having rubber-like properties are required, such as (for gaskets, electrical insulation for example, conductor insulation), shock absorbers, etc. Owing to their extraordinary resistance to deterioration at high temperatures, they are particularly useful in applications where natural rubber or other synthetic rubbers fail owing to the deleterious effect of heat. The dimethyl silicone elastomers are further endowed with the property of retaining their flexibility at low temperatures.

It is to be understood that the invention is not restricted to the fillers mentioned hereinbefore. Fillers in addition to those specifically mentioned in the examples which may be employed in the practice of my invention are whiting, lithopone, talc, zinc oxide and the other finely divided solid materials used as fillers for known natural and synthetic rubbers.

What I claim as new and desire to secure by Letters Patent of the United States is:

1. A solid, elastic, curable methyl polysiloxane consisting of methyl radicals and silicon and oxygen atoms and containing an average of from 1.98 to 2.0 methyl groups per silicon atom, said solid methyl polysiloxane being the product of condensation of a liquid polymeric dimethylsiloxane containing up to 2 mol per cent copolymerized monomethylsiloxane.

2. A heat-curable composition containing a filler and as an essential elastic ingredient a synthetic material consisting of a solid, elastic, curable methyl polysiloxane consisting of methyl radicals and silicon and oxygen atoms and containing an average of from 1.98 to 2.0 methyl groups per silicon atom, said solid methyl polysiloxane being the product of condensation of a liquid polymeric dimethylsiloxane containing up to 2 mol per cent copolymerized monomethylsiloxane.

3. A synthetic elastomeric product comprising the heat-cured composition of claim 2.

4. A solid, elastic, curable methyl polysiloxane consisting of methyl radicals and silicon and oxygen atoms and containing an average of from 1.98 to 2.0 methyl groups per silicon atom, said solid methyl polysiloxane having been obtained by condensing, with an iron halide, a liquid polymeric dimethylsiloxane containing up to 2 mol per cent copolymerized monomethylsiloxane.

5. A solid, elastic product as in claim 4 wherein the iron halide is a ferric chloride.

6. A heat-curable elastic composition containing a filler and as the essential elastic element a solid, elastic, curable methyl polysiloxane consisting of methyl radicals and silicon and oxygen atoms and containing an average of from 1.98 to 2.0 methyl groups per silicon atom, said solid methyl polysiloxane having been obtained by condensing with a ferric chloride a liquid polymeric dimethylsiloxane containing up to 2 mol per cent copolymerized monomethylsiloxane.

7. A synthetic elastomeric product comprising the cured composition of claim 6.

8. A new, solid, elastic composition containing as an elastic element thereof a solid, elastic, curable methyl polysiloxane consisting of methyl radicals and silicon and oxygen atoms and containing an average of from 1.98 to 2.0 methyl groups per silicon atom, said solid composition having been obtained by heating a mixture of (1) a liquid consisting of polymeric dimethylsiloxane containing up to 2 mol per cent copolymerized monomethylsiloxane, (2) ferric oxide with (3) a catalytic amount of aluminum chloride.

9. An insulated electrical conductor comprising a metallic conductor core and insulation thereon comprising a synthetic, solid, elastomeric methyl polysiloxane consisting of methyl radicals and silicon and oxygen atoms and containing an average of from 1.98 to 2.0 methyl groups per silicon atom, said solid methyl polysiloxane having been obtained by condensing a liquid polymeric dimethylsiloxane containing up to 2 mol per cent copolymerized monomethylsiloxane.

10. An insulated electrical conductor comprising a metallic conductor core and insulation thereon comprising a cured, solid, elastomeric composition comprising substantially (1) a filler and (2) a solid, elastic, curable methyl polysiloxane consisting of methyl radicals and silicon and oxygen atoms and containing an average of from 1.98 to 2.0 methyl groups per silicon atom, said solid methyl polysiloxane having been obtained by condensing under heat a mixture of (a) a liquid consisting of polymeric dimethylsiloxane containing up to 2 mol per cent copolymerized monomethylsiloxane and (b) a ferric chloride.

11. The process of making a solid, elastic, curable methyl polysiloxane consisting of methyl radicals and silicon and oxygen atoms containing an average of from 1.98 to 2.0 methyl groups per silicon atom, which process comprises condensing a liquid polymeric dimethylsiloxane containing up to 2 mol per cent copolymerized monomethylsiloxane.

12. The process of making a solid, elastic, curable methyl polysiloxane consisting of methyl radicals and silicon and oxygen atoms and containing an average of from 1.98 to 2.0 methyl groups per silicon atom which process comprises condensing with from 1 to 40 per cent, by weight, of an iron halide, a liquid polymeric dimethylsiloxane containing up to 2 mol per cent copolymerized monomethylsiloxane.

13. The process as in claim 12 wherein the iron halide is a hydrated ferric chloride.

14. The process of making a solid, elastic methyl polysiloxane consisting of methyl radicals and silicon and oxygen atoms and containing an average of from 1.98 to 2.0 methyl groups per silicon atom, which process comprises (1) treating with ferric chloride hexahydrate a liquid polymeric dimethylsiloxane containing up to 2 mol per cent copolymerized monomethylsiloxane thereby to obtain a heat-curable, solid, elastic product, (2) compounding the elastic product of (1) with a filler and a cure accelerator consisting of aluminum chloride, and (3) heating the resulting composition of step (2) until a cured elastomeric product is obtained.

15. The process as in claim 14 wherein the filler is titanium dioxide.

16. The process of making a solid, elastic, cured methyl polysiloxane consisting of methyl radicals and silicon and oxygen atoms and containing an average of from 1.98 to 2.0 methyl groups per silicon atom, which process comprises (1) treating, with ferric chloride hexahydrate under heat, a liquid polymeric dimethylsiloxane containing up to 2 mol per cent copolymerized monomethylsiloxane thereby to obtain a solid, elastic, curable product, (2) mixing the elastic product obtained in (1) with ferric oxide as a filler and aluminum chloride as a cure accelerator, and (3) heating the resulting composition in (2) until a cured elastomeric product is obtained.

17. The process of making a cured elastomeric composition which comprises (1) hydrolyzing dimethyldichlorosilane containing up to 2 mol per cent methyltrichlorosilane with concentrated hydrochloric acid, (2) isolating and washing the oily product of hydrolysis, (3) mixing the washed product with ferric oxide and aluminum chloride, (4) heating the mixture obtained in (3) until a solid, elastic, curable methyl polysiloxane containing an average of from 1.98 to 2.0 methyl groups per silicon atom is obtained, (5) admixing the elastic product of (4) with a filler on rubber rolls and (6) curing the resultant product obtained in (5) at an elevated temperature.

18. The process for making a synthetic elastic composition which comprises (1) mixing a liquid methyl polysiloxane containing an average of from 1.98 to 2.0 methyl groups per silicon atom and consisting of polymeric dimethylsiloxane containing up to 2 mol per cent copolymerized monomethylsiloxane with ferric oxide and a catalytic amount of aluminum chloride and (2) milling the resultant product at a temperature of from 75° to 125° C. until a solid, elastic, curable methyl polysiloxane is obtained.

MAYNARD C. AGENS.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,431,878 | McGregor et al. | Dec. 2, 1947 |
| 2,438,478 | Hyde | Mar. 23, 1948 |

FOREIGN PATENTS

| Number | Country | Date |
|---|---|---|
| 113,708 | Australia | Sept. 4, 1941 |

OTHER REFERENCES

Rochow et al., Journ. Amer. Chem. Soc., vol. 63, pp. 798 to 800, March 1941.

Hackh's Chemical Dictionary, 2d ed. 1937, p. 847, article "Silicone."